United States Patent
Yang et al.

(10) Patent No.: US 10,200,973 B2
(45) Date of Patent: Feb. 5, 2019

(54) NETWORK ACCESSING METHOD FOR MOBILE TERMINAL AND MOBILE TERMINAL

(71) Applicant: Huawei Technologies Co., Ltd., Shenzhen (CN)

(72) Inventors: Xiaodong Yang, Shenzhen (CN); Xuelong Wang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/796,502

(22) Filed: Oct. 27, 2017

(65) Prior Publication Data

US 2018/0054802 A1 Feb. 22, 2018

Related U.S. Application Data

(63) Continuation of application No. 14/801,612, filed on Jul. 16, 2015, now Pat. No. 9,814,022, which is a continuation of application No. PCT/CN2013/070522, filed on Jan. 16, 2013.

(51) Int. Cl.
*H04W 72/00* (2009.01)
*H04W 76/10* (2018.01)
(Continued)

(52) U.S. Cl.
CPC ....... *H04W 72/005* (2013.01); *H04W 40/246* (2013.01); *H04W 48/10* (2013.01);
(Continued)

(58) Field of Classification Search
None
See application file for complete search history.

(56) References Cited

U.S. PATENT DOCUMENTS 8,767,705 B2 * 7/2014 Goppner ................ H04B 7/269
370/350
9,125,105 B2 * 9/2015 Kwon ................... H04W 28/16
(Continued)

FOREIGN PATENT DOCUMENTS

CN 101296172 A 10/2008
CN 101771720 A 7/2010
(Continued)

OTHER PUBLICATIONS

Raghothaman, B. et al., "System Architecture for a Cellular Network with Cooperative Mobile Relay," IEEE Vehicular Technology Conference (VTC Fall), Sep. 5-8, 2011; 5 pages.

*Primary Examiner* — Robert C Scheibel
(74) *Attorney, Agent, or Firm* — Slater Matsil, LLP

(57) ABSTRACT

Embodiments disclose a network accessing method for a mobile terminal, and a mobile terminal. In some implementation manners of the present invention, a mobile terminal reads a help request used for accessing a network by another mobile terminal; sends a beacon channel on a beacon channel resource allocated by a base station of the network, and sends a broadcast signal on a broadcast channel resource corresponding to the beacon channel resource, where the broadcast signal includes an access resource; and receives an access request of the another mobile terminal on the access resource, and assists the another mobile terminal in accessing the network.

20 Claims, 6 Drawing Sheets

(51) Int. Cl.
*H04W 76/14* (2018.01)
*H04W 88/04* (2009.01)
*H04W 48/10* (2009.01)
*H04W 40/24* (2009.01)
*H04W 74/00* (2009.01)
*H04W 48/12* (2009.01)
*H04W 48/16* (2009.01)
*H04W 74/08* (2009.01)

(52) U.S. Cl.
CPC ......... *H04W 48/12* (2013.01); *H04W 74/006* (2013.01); *H04W 76/10* (2018.02); *H04W 76/14* (2018.02); *H04W 48/16* (2013.01); *H04W 74/0866* (2013.01); *H04W 88/04* (2013.01)

(56) References Cited

U.S. PATENT DOCUMENTS

| | | | | |
|---|---|---|---|---|
| 9,814,022 | B2* | 11/2017 | Yang | .................... H04W 76/14 |
| 2001/0036810 | A1 | 11/2001 | Larsen | |
| 2007/0183360 | A1* | 8/2007 | Arunan | ................. H04W 88/04 370/328 |
| 2010/0167743 | A1* | 7/2010 | Palanki | .................. H04B 7/155 455/436 |
| 2011/0300892 | A1 | 12/2011 | Hakola et al. | |
| 2012/0315841 | A1* | 12/2012 | Zhou | .................... H04B 7/2606 455/11.1 |
| 2013/0016630 | A1* | 1/2013 | Bhushan | ............... H04W 48/12 370/255 |
| 2014/0078935 | A1 | 3/2014 | Sun | |
| 2014/0171062 | A1* | 6/2014 | Fallgren | ................ H04W 40/22 455/422.1 |

FOREIGN PATENT DOCUMENTS

| | | |
|---|---|---|
| CN | 101841920 A | 9/2010 |
| CN | 101854728 A | 10/2010 |
| CN | 102469410 A | 5/2012 |
| CN | 102790950 | 11/2012 |
| CN | 102811497 A | 12/2012 |
| CN | 102844993 A | 12/2012 |

* cited by examiner

NETWORK ACCESSING METHOD FOR MOBILE TERMINAL AND MOBILE TERMINAL

CROSS-REFERENCE TO RELATED APPLICATIONS

This application is a continuation of U.S. patent application Ser. No. 14/801,612, filed on Jul. 16, 2015, now U.S. Pat. No. 9,814,022, which is a continuation of International Application No. PCT/CN2013/070522, filed on Jan. 16, 2013. All of the aforementioned applications are hereby incorporated by reference in their entireties.

TECHNICAL FIELD

The present invention relates to the field of communications technologies, and specifically, to a network accessing method for a mobile terminal, and a mobile terminal.

BACKGROUND

In a current cellular system, a base station includes a macro base station and a micro base station. Because distances from different mobile terminals to the base station are different, interference to different mobile terminals is different, which causes that channel quality of different mobile terminals is different. In addition, in some cases, some mobile terminals may not be covered by a base station, for example, a mobile terminal falls in a coverage hole area, or a base station is damaged for some special reasons, such as an earthquake. Such a mobile terminal that is not covered needs another mobile terminal to help access a network. A mobile terminal that is not covered or weakly covered is defined as an access mobile terminal, and a mobile terminal that can connect to a base station to access a network and can help the access mobile terminal access the network is defined as a base-station mobile terminal.

Because the access mobile terminal needs the base-station mobile terminal to help access a network, the access mobile terminal needs to discover the base-station mobile terminal and also needs to establish a connection to the base-station mobile terminal, and in this way, a final aim of accessing the network by the access mobile terminal can be implemented. Currently, an existing discovering manner for mobile terminals is mainly a manner in which mobile terminals autonomously discover each other. Each mobile terminal sends a beacon channel on a specific resource, so as to discover each other by checking beacon channels of each other.

Because a beacon channel resource is limited, it is necessary to check, before a mobile terminal sends a beacon channel, whether there is a beacon channel resource, and if there is a beacon channel resource, the mobile terminal sends the beacon channel. In this way, a disadvantage of a distributed manner for autonomously using a beacon channel by a mobile terminal is that a mobile terminal may use a beacon channel but does not establish a connection to another mobile terminal, thereby wasting the beacon channel.

SUMMARY

Embodiments of the present invention provide a network accessing method for a mobile terminal, and a mobile terminal, which can more effectively use a beacon channel resource.

According to a first aspect, embodiments of the present invention provide a network accessing method for a mobile terminal. The method includes reading a help request used for accessing a network by the mobile terminal. The method also includes sending a beacon channel on a beacon channel resource allocated by a base station of the network, and sending a broadcast signal on a broadcast channel resource corresponding to the beacon channel resource, where the broadcast signal includes an access resource. The method also includes receiving an access request of the mobile terminal on the access resource, and assisting the mobile terminal in accessing the network.

In a first possible implementation manner, the step of sending a beacon channel on a beacon channel resource allocated by a base station of the network, and sending a broadcast signal on a broadcast channel resource corresponding to the beacon channel resource, where the broadcast signal includes an access resource further includes: establishing a radio resource control (RRC) connection to the base station of the network, and sending a request for becoming a base-station mobile terminal to the network; receiving the beacon channel resource, the broadcast channel resource, and the access resource that are allocated by the base station of the network; and sending the beacon channel on the beacon channel resource, and sending the broadcast signal on the broadcast channel resource, where the broadcast signal includes the access resource.

In a second possible implementation manner, the step of sending a beacon channel on a beacon channel resource allocated by a base station of the network, and sending a broadcast signal on a broadcast channel resource corresponding to the beacon channel resource, where the broadcast signal includes an access resource further includes: becoming a base-station mobile terminal; sending an allocation request to the network; receiving the beacon channel resource, the broadcast channel resource, and the access resource that are allocated by the base station of the network; and sending the beacon channel on the beacon channel resource, and sending the broadcast signal on the broadcast channel resource, where the broadcast signal includes the access resource.

With reference to the first or the second possible implementation manner, in a third possible implementation manner, the step of receiving an access request of the mobile terminal on the access resource, and assisting the mobile terminal in accessing the network further includes: receiving the access request of the mobile terminal on the access resource, and assisting the mobile terminal in completing access to the network.

With reference to the first or the second possible implementation manner, in a fourth possible implementation manner, the step of receiving the beacon channel resource, the broadcast channel resource, and the access resource that are allocated by the base station of the network further includes: receiving the beacon channel resource, the broadcast channel resource, and the access resource that are allocated by the base station of the network by using radio resource control protocol signaling.

In a fifth possible implementation manner, the step of sending a beacon channel on a beacon channel resource allocated by a base station of the network, and sending a broadcast signal on a broadcast channel resource corresponding to the beacon channel resource, where the broadcast signal includes an access resource further includes: camping on the base station of the network, and acquiring a beacon channel resource set and an access resource set by means of broadcast of the base station, where the beacon channel resource set includes an idle beacon channel resource, and the access resource set includes the access resource; and sending the beacon channel on the idle beacon channel resource in the beacon channel resource set, and sending the broadcast signal on a broadcast channel resource corresponding to the idle beacon channel resource, where the broadcast signal includes the access resource.

With reference to the fifth possible implementation manner, in a sixth possible implementation manner, the step of receiving an access request of the mobile terminal on the access resource, and assisting the mobile terminal in accessing the network further includes: receiving the access request of the mobile terminal on the access resource; and accessing the base station and requesting to become a base-station mobile terminal, so as to assist the mobile terminal in completing access to the network.

According to a second aspect, embodiments of the present invention provide a mobile terminal. The mobile terminal includes a reading module, configured to read a help request used for accessing a network by another mobile terminal. The mobile terminal also includes a broadcasting module, configured to send a beacon channel on a beacon channel resource allocated by a base station of the network, and send a broadcast signal on a broadcast channel resource corresponding to the beacon channel resource, where the broadcast signal includes an access resource. The mobile terminal also includes a receiving module, configured to receive an access request of the another mobile terminal on the access resource, and assist the another mobile terminal in accessing the network.

In a first possible implementation manner, the broadcasting module includes: a network connecting submodule, configured to establish a RRC connection to the base station of the network, send a request for becoming a base-station mobile terminal to the network, and receive the beacon channel resource, the broadcast channel resource, and the access resource that are allocated by the base station of the network; and a broadcasting submodule, configured to send the beacon channel on the beacon channel resource allocated by the base station of the network, and send the broadcast signal on the broadcast channel resource, where the broadcast signal includes the access resource.

In a second possible implementation manner, the mobile terminal further includes a base-station module, configured to make the mobile terminal become a base-station mobile terminal; and the broadcasting module includes: a network connecting submodule, configured to send an allocation request to the network, and receive the beacon channel resource, the broadcast channel resource, and the access resource that are allocated by the base station of the network; and a broadcasting submodule, configured to send the beacon channel on the beacon channel resource, and send the broadcast signal on the broadcast channel resource, where the broadcast signal includes the access resource.

With reference to the first or the second possible implementation manner, in a third possible implementation manner, the network connecting submodule receives the beacon channel resource, the broadcast channel resource, and the access resource that are allocated by the base station of the network by using radio resource control protocol signaling.

In a fourth possible implementation manner, the broadcasting module includes: a network connecting submodule, configured to camp on the base station of the network, acquire a beacon channel resource set and an access resource set by means of broadcast of the base station, where the beacon channel resource set includes an idle beacon channel resource, and the access resource set includes the access resource; and a broadcasting submodule, configured to send the beacon channel on the idle beacon channel resource in the beacon channel resource set, and send the broadcast signal on a broadcast channel resource corresponding to the idle beacon channel resource, where the broadcast signal includes the access resource.

With reference to the fourth possible implementation manner, in a fifth possible implementation manner, the network connecting submodule is further configured to, after the receiving module receives the access request, access the base station and request to become a base-station mobile terminal, so as to assist the another mobile terminal in accessing the network.

According to a third aspect, embodiments of the present invention provide a computer storage medium, where the computer storage medium may store a program, and the program is used to perform the steps according to the first aspect of the present invention or any one of the first to the sixth possible implementation manners of the first aspect.

According to a fourth aspect, embodiments of the present invention provide a mobile terminal, including an input apparatus, an output apparatus, a memory, and a processor, where the processor performs the following steps: reading a help request used for accessing a network by another mobile terminal; sending a beacon channel on a beacon channel resource allocated by a base station of the network, and sending a broadcast signal on a broadcast channel resource corresponding to the beacon channel resource, where the broadcast signal includes an access resource; and receiving an access request of the another mobile terminal on the access resource, and assisting the another mobile terminal in accessing the network.

In a first possible implementation manner, the step, which is performed by the processor, of sending a beacon channel on a beacon channel resource allocated by a base station of the network, and sending a broadcast signal on a broadcast channel resource corresponding to the beacon channel resource, where the broadcast signal includes an access resource further includes: establishing a RRC connection to the base station of the network, and sending a request for becoming a base-station mobile terminal to the network; receiving the beacon channel resource, the broadcast channel resource, and the access resource that are allocated by the base station of the network; and sending the beacon channel on the beacon channel resource, and sending the broadcast signal on the broadcast channel resource, where the broadcast signal includes the access resource.

In a second possible implementation manner, the step, which is performed by the processor, of sending a beacon channel on a beacon channel resource allocated by a base station of the network, and sending a broadcast signal on a broadcast channel resource corresponding to the beacon channel resource, where the broadcast signal includes an access resource further includes: becoming a base-station mobile terminal; sending an allocation request to the network; receiving the beacon channel resource, the broadcast channel resource, and the access resource that are allocated by the base station of the network; and sending the beacon channel on the beacon channel resource, and sending the broadcast signal on the broadcast channel resource, where the broadcast signal includes the access resource.

With reference to the first or the second possible implementation manner, in a third possible implementation manner, the step, which is performed by the processor, of receiving an access request of the another mobile terminal on the access resource, and assisting the another mobile terminal in accessing the network further includes: receiving the access request of the another mobile terminal on the access resource, and assisting the another mobile terminal in completing access to the network.

With reference to the first or the second possible implementation manner, in a fourth possible implementation manner, the step, which is performed by the processor, of receiving the beacon channel resource, the broadcast channel resource, and the access resource that are allocated by the base station of the network further includes: receiving the beacon channel resource, the broadcast channel resource, and the access resource that are allocated by the base station of the network by using radio resource control protocol signaling.

In a fifth possible implementation manner, the step, which is performed by the processor, of sending a beacon channel on a beacon channel resource allocated by a base station of the network, and sending a broadcast signal on a broadcast channel resource corresponding to the beacon channel resource, where the broadcast signal includes an access resource further includes: camping on the base station of the network, and acquiring a beacon channel resource set and an access resource set by means of broadcast of the base station, where the beacon channel resource set includes an idle beacon channel resource, and the access resource set includes the access resource; and sending the beacon channel on the idle beacon channel resource in the beacon channel resource set, and sending the broadcast signal on a broadcast channel resource corresponding to the idle beacon channel resource, where the broadcast signal includes the access resource.

With reference to the fifth possible implementation manner, in a sixth possible implementation manner, the step, which is performed by the processor, of receiving an access request of the another mobile terminal on the access resource, and assisting the another mobile terminal in accessing the network further includes: receiving the access request of the another mobile terminal on the access resource; and accessing the base station and requesting to become a base-station mobile terminal, so as to assist the another mobile terminal in completing access to the network.

According to the network accessing method for a mobile terminal, and the mobile terminal, the beacon channel is sent on the beacon channel resource allocated by the base station of the network, and the broadcast signal is sent on the broadcast channel resource corresponding to the beacon channel resource, to indicate the access resource, so that another mobile terminal connects to the mobile terminal on the access resource and then accesses the network, which avoids a waste of the beacon channel and more properly uses the beacon channel and the access resource.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
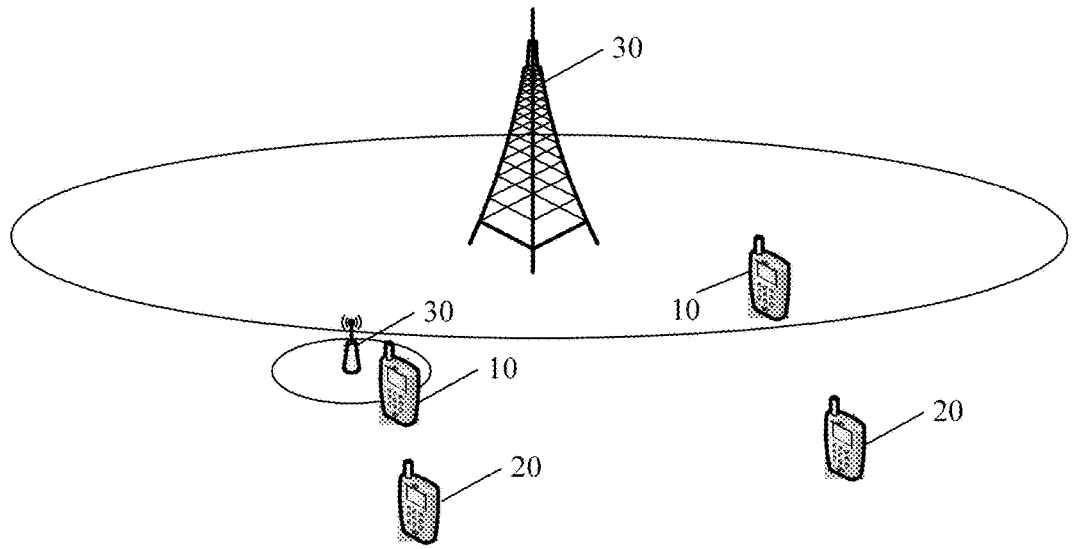
FIG. 1 is a schematic diagram of an application environment according to an embodiment of the present invention.

Referring to FIG. 1, FIG. 1 is a schematic diagram of an application environment of a network accessing method for a mobile terminal according to an embodiment of the present invention. In an implementation manner of the present invention, the network accessing method for a mobile terminal is used in a mobile communications system, for example, a Long Term Evolution (LTE for short) network, and a network under the 3rd Generation Partnership Project (3GPP for short). In some implementation manners of the present invention, the network accessing method for a mobile terminal may also be used in a wireless system. A network shown in FIG. 1 is a mobile communications system network, including a base station 30, where the base station 30 includes a macro base station (only one macro base station is used as an example in FIG. 1) and a micro base station (only one micro base station is used as an example in FIG. 1). A mobile terminal 10 is in coverage of the base station 30 and can access a network; and a mobile terminal 20 is not in the coverage of the base station 30, and cannot access the network, and therefore, the mobile terminal 10 is needed to assist the mobile terminal 20 in accessing the network. The mobile terminal 20 that is not covered or weakly covered is defined as an access mobile terminal, and the mobile terminal 10 that can connect to the base station 30 to access the network and can help the access mobile terminal 20 access the network is defined as a base-station mobile terminal.

It should be noted that, in specific implementation, a function of a beacon channel is to make a terminal be discovered by another terminal. Therefore, in specific implementation, a resource allocated by the base station in the present invention is not merely limited to a beacon channel, and code that can be used to discover a terminal can be allocated by the base station in the present invention. That is, in this embodiment of the present invention, a beacon channel is merely used to indicate code used to discover a terminal, but is not used to limit use of other code having a terminal discovering function in this embodiment of the present invention.

It may be understood that, because a base-station mobile terminal and an access mobile terminal move, the base-station mobile terminal may also become an access mobile terminal, and the access mobile terminal may also become a base-station mobile terminal.

Figure 2:
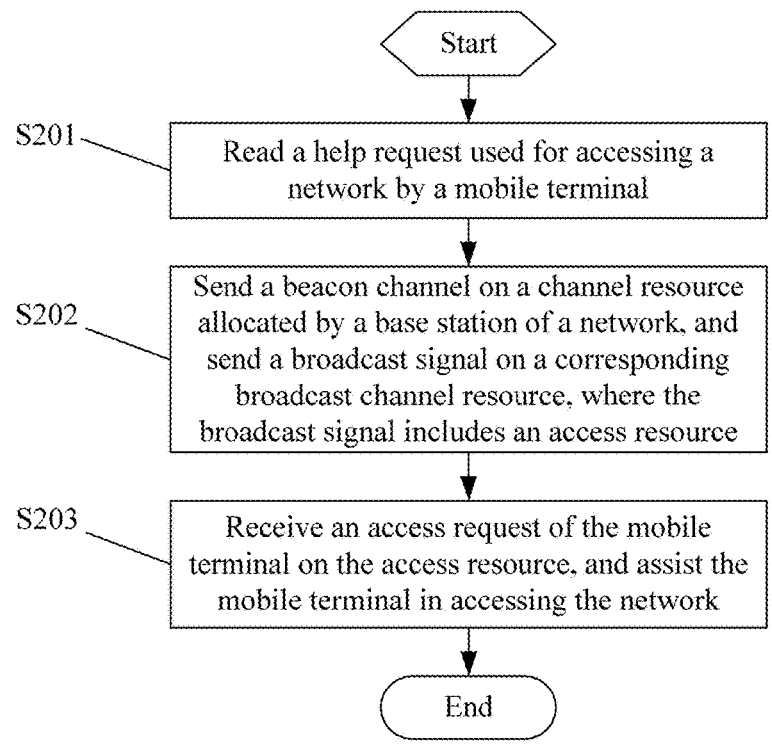
FIG. 2 to FIG. 4 are schematic flowcharts of a network accessing method for a mobile terminal according to embodiments of the present invention.

With reference to FIG. 1 and referring to FIG. 2, a network accessing method for a mobile terminal according to a first embodiment of the present invention includes the following steps.

S201. Read a help request used for accessing a network by the mobile terminal 20.

In this embodiment, the mobile terminal 20 is an access mobile terminal 20 that cannot access a network, and therefore, sends, on an agreed resource, the help request used for accessing a network, where the agreed resource may be, for example, a first timeslot of a frequency. By means of scanning, the mobile terminal 10 reads, on the agreed resource, the help request used for accessing a network by the mobile terminal 20.

S202. Send a beacon channel on a beacon channel resource allocated by a base station of the network, and send a broadcast signal on a broadcast channel resource corresponding to the beacon channel resource, where the broadcast signal includes an access resource.

In some implementation manners of the present invention, the mobile terminal 10 sends the beacon channel on the beacon channel resource allocated by the base station of the network. For example, there are resources of eight subframes from 0 to 7, and a second subframe is idle. In this case, the base station may allocate the second subframe to the mobile terminal 10, and the mobile terminal 10 may send a beacon channel in the second subframe and send a broadcast signal on a broadcast channel resource corresponding to the second subframe, for example, a third subframe, where the broadcast signal includes an access resource, for example, a fifth subframe.

S203. Receive an access request of the mobile terminal 20 on the access resource, and assist the mobile terminal 20 in accessing the network.

According to the network accessing method for a mobile terminal, the beacon channel is sent on the beacon channel resource allocated by the base station of the network, and the broadcast signal is sent on the broadcast channel resource corresponding to the beacon channel resource, to indicate the access resource, so that the mobile terminal 20 connects to the mobile terminal 10 on the access resource and then accesses the network, which avoids a waste of the beacon channel and more properly uses the beacon channel and the access resource.

Figure 3:
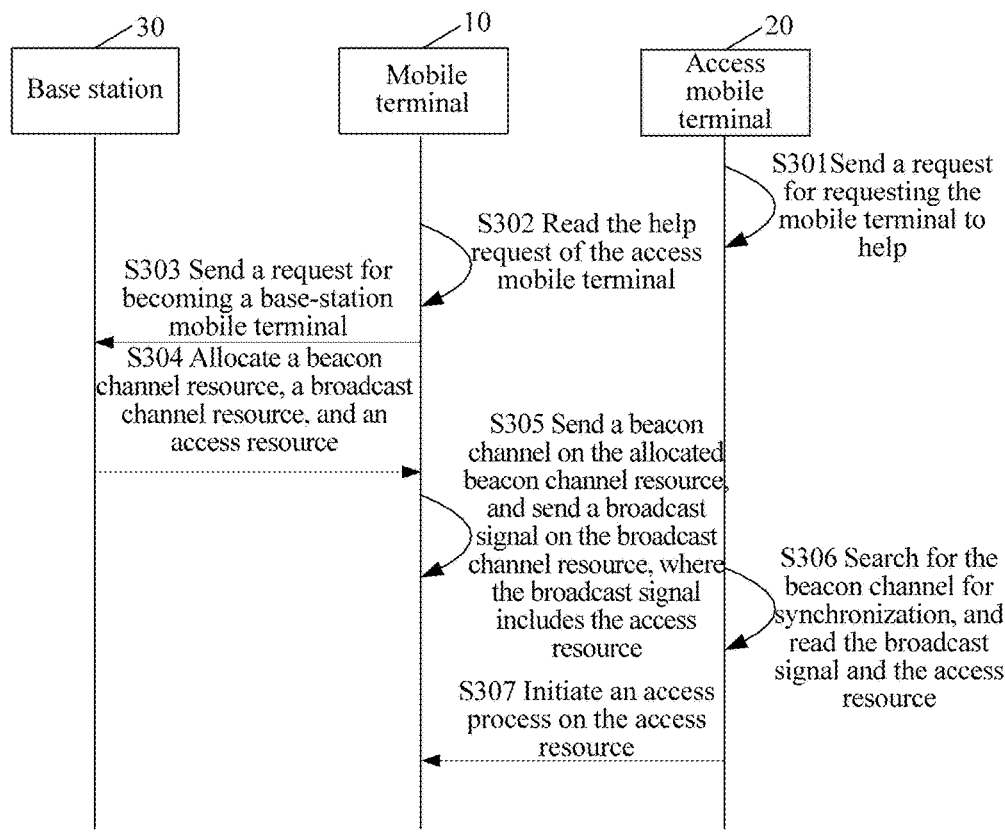

With reference to FIG. 1 and referring to FIG. 3, a network accessing method for a mobile terminal according to a second embodiment of the present invention includes:

S301. The access mobile terminal 20 sends a request for requesting the mobile terminal 10 to help access a network.

S302. The mobile terminal 10 reads the help request of the access mobile terminal 20.

S303. The mobile terminal 10 establishes a radio resource control (RRC) protocol connection to the base station 30 of the network, and sends a request for becoming a base-station mobile terminal to the base station 30.

In this embodiment of the present invention, if the mobile terminal 10 intends to become a base-station mobile terminal after reading the help request of the access mobile terminal 20, the mobile terminal 10 sends the request for becoming a base-station mobile terminal to the base station 30.

In some embodiments of the present invention, the mobile terminal 10 may also have become a base-station mobile terminal; in this case, the mobile terminal 10 sends only an allocation request to the base station 30.

S304. The base station 30 allocates a beacon channel resource, a broadcast channel resource, and an access resource to the mobile terminal 10.

In this embodiment of the present invention, the base station 30 allocates the beacon channel resource, the broadcast channel resource, and the access resource to the mobile terminal 10 by using radio resource control protocol signaling.

In some implementation manners of the present invention, the beacon channel resource, the broadcast channel resource, and the access resource that are allocated by the base station 30 include a timeslot resource, a frequency resource, a code channel resource, and the like.

In this case, the mobile terminal 10 becomes a base-station mobile terminal.

S305. The mobile terminal 10 sends a beacon channel on the beacon channel resource allocated by the base station 30, and sends a broadcast signal on the broadcast channel resource, where the broadcast signal includes the access resource.

Step S303 to S305 are specific implementation steps of step S202 in FIG. 2.

S306. The access mobile terminal 20 searches for the beacon channel, and synchronizes with the mobile terminal 10, so as to read the broadcast signal and read the access resource from the broadcast signal.

S307. The access mobile terminal 20 initiates an access process on the read access resource, that is, sends an access request to the mobile terminal 10.

After receiving the access request of the access mobile terminal 20, the base-station mobile terminal 10 may help the access mobile terminal 20 complete access to the network, that is, the base station 30.

According to the network accessing method for a mobile terminal, the beacon channel is sent on the beacon channel resource allocated by the base station 30, and the broadcast signal is sent on the broadcast channel resource corresponding to the beacon channel resource, to indicate the access resource, so that the mobile terminal 20 connects to the mobile terminal 10 on the access resource and then accesses the network, which avoids a waste of the beacon channel and more properly uses the beacon channel and the access resource.

Figure 4:
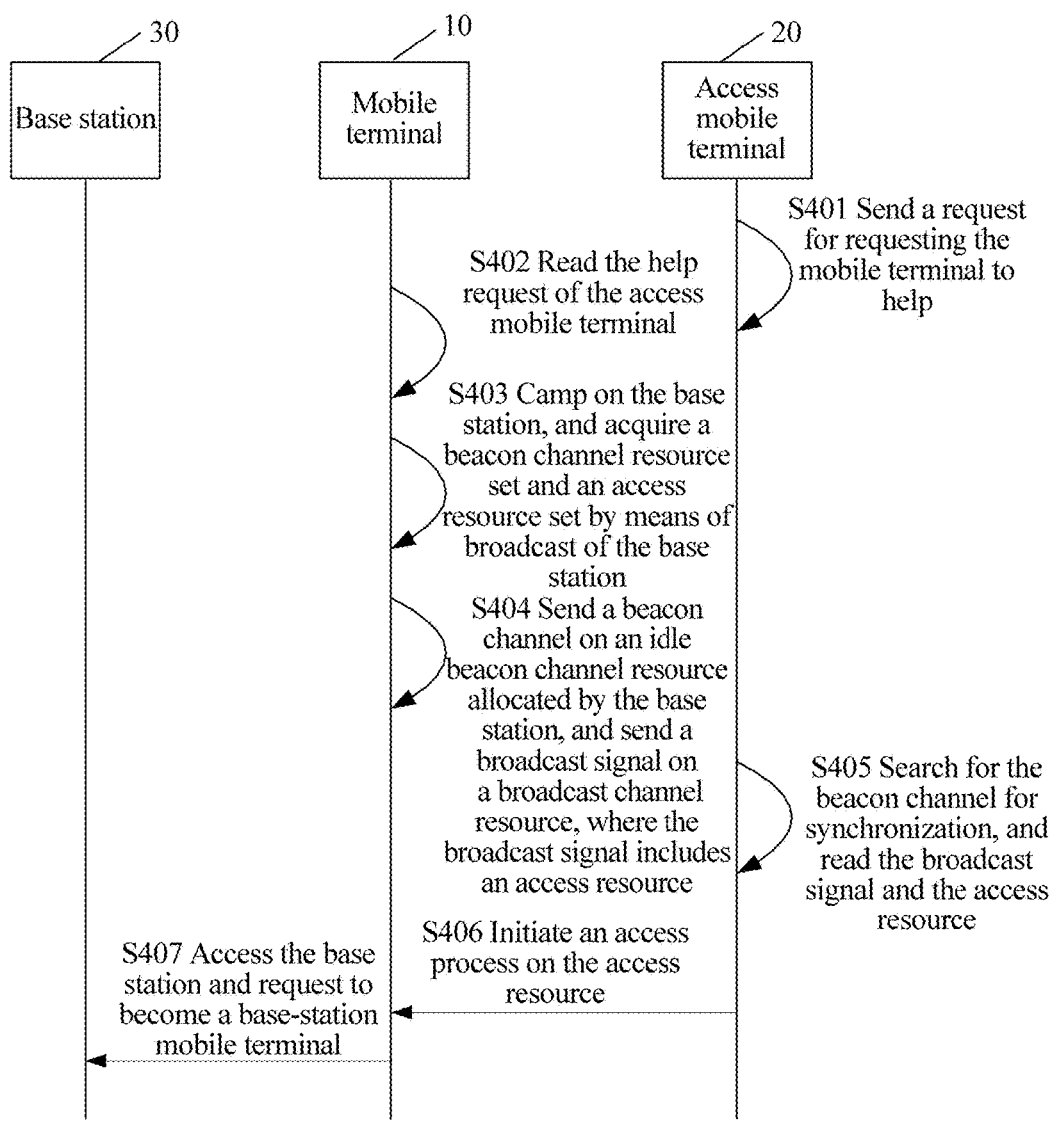

With reference to FIG. 1 and referring to FIG. 4, a network accessing method for a mobile terminal according to a third embodiment of the present invention includes the following steps.

S401. The access mobile terminal 20 sends a request for requesting the base-station mobile terminal 10 to help access a network.

S402. The mobile terminal 10 reads the help request of the access mobile terminal 20.

S403. The mobile terminal 10 camps on the base station 30, and acquires a beacon channel resource set and an access resource set by means of broadcast of the base station 30.

S404. The mobile terminal 10 sends a beacon channel on an idle beacon channel resource in the beacon channel resource set, and sends a broadcast signal on a broadcast channel resource, where the broadcast signal includes an access resource.

The mobile terminal 10 checks whether there is an idle beacon channel resource in the beacon channel resource set broadcasted by the base station 30, and if there is an idle beacon channel resource in the beacon channel resource set broadcasted by the base station 30, the mobile terminal 10 sends the beacon channel on the idle beacon channel resource in the beacon channel resource set, and sends the broadcast signal on a corresponding broadcast channel resource, where the broadcast signal includes the access resource.

Step S403 to step S404 are specific implementation manners of step S202 in FIG. 2.

S405. The access mobile terminal 20 searches for the beacon channel, and synchronizes with the mobile terminal 10, so as to read the broadcast signal and read the access resource from the broadcast signal.

S406. The access mobile terminal 20 initiates an access process on the read access resource, that is, sends an access request to the mobile terminal 10.

S407. The mobile terminal 10 accesses the base station 30 and requests to become a base-station mobile terminal, so as to assist the access mobile terminal in completing access to the network.

According to the network accessing method for a mobile terminal, it is checked whether there is an idle beacon channel resource in the beacon channel resource set broadcasted by the base station 30, the beacon channel is sent on the idle beacon channel resource in the beacon channel resource set, and the broadcast signal is sent on a broadcast channel resource corresponding to the idle beacon channel resource, to indicate the access resource, so that the mobile terminal 20 connects to the mobile terminal 10 on the access resource and then accesses a network, which avoids a waste of the beacon channel and more properly uses the beacon channel and the access resource. In addition, only after receiving the access request of the access mobile terminal 20, the mobile terminal 10 accesses the base station 30 and requests to become a base-station mobile terminal, thereby avoiding a waste of a resource.

To better implement the foregoing solutions in the embodiments of the present invention, a related apparatus configured to cooperate to implement the foregoing solutions is provided in the following.

Figure 5:
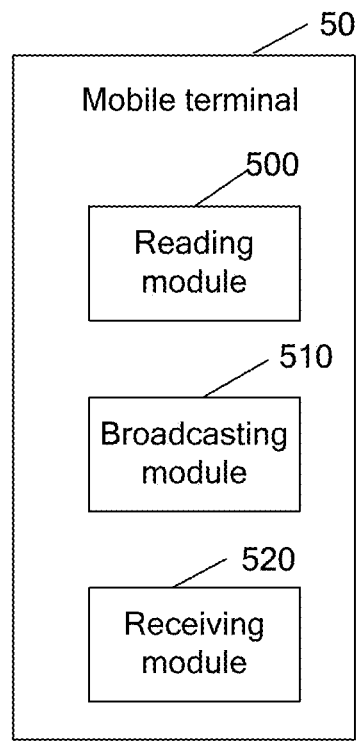
FIG. 5 to FIG. 8 are schematic diagrams of a mobile terminal according to embodiments of the present invention.

Referring to FIG. 5, a mobile terminal 50 according to an embodiment of the present invention includes a reading module 500, a broadcasting module 510, and a receiving module 520. The reading module 500 is configured to read a help request used for accessing a network by another mobile terminal. The another mobile terminal is not covered by a network or weakly covered by a network, and therefore the another mobile terminal requests the mobile terminal 50 to help access the network.

The broadcasting module 510 is configured to send a beacon channel on a beacon channel resource allocated by a base station of the network, and send a broadcast signal on a broadcast channel resource corresponding to the beacon channel resource, where the broadcast signal includes an access resource. The receiving module 520 is configured to receive an access request of the another mobile terminal on the access resource, and assist the another mobile terminal in accessing the network.

Figure 6:
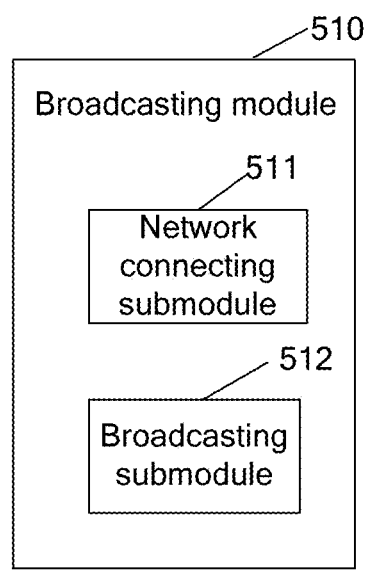

Referring to FIG. 6, the broadcasting module 510 includes a network connecting submodule 511 and a broadcasting submodule 512.

In some implementation manners of the present invention, the network connecting submodule 511 is configured to send a request for becoming a base-station mobile terminal to the network and receive the beacon channel resource, the broadcast channel resource, and the access resource that are allocated by the base station of the network. The broadcasting submodule 512 is configured to send the beacon channel on the beacon channel resource, and send the broadcast signal on the broadcast channel resource, where the broadcast signal includes the access resource.

In some implementation manners of the present invention, the network connecting submodule 511 receives the beacon channel resource, the broadcast channel resource, and the access resource that are allocated by the base station of the network by using radio resource control protocol signaling.

In some implementation manners of the present invention, the network connecting submodule 511 is configured to camp on the base station of the network, and acquire a beacon channel resource set and an access resource set by means of broadcast of the base station, where the beacon channel resource set includes the idle beacon channel resource, and the access resource set includes the access resource. The broadcasting submodule 512 is configured to send the beacon channel on the idle beacon channel resource in the beacon channel resource set, and send the broadcast signal on the broadcast channel resource corresponding to the beacon channel resource, where the broadcast signal includes the access resource.

In some implementation manners of the present invention, the network connecting submodule 511 is further configured to, after the receiving module receives the access request, access the base station and request to become a base-station mobile terminal, so as to assist the another mobile terminal in accessing the network.

It may be understood that the mobile terminal 50 in this embodiment may be, for example, a computer, a mobile phone, or a tablet computer.

It may be understood that, functions of all function modules of the mobile terminal 50 in this embodiment may be specifically implemented according to the methods in the foregoing first to third embodiments. For a specific implementation process, reference may be made to related descriptions in the methods in the foregoing first to third embodiments, and details are not described herein.

The foregoing mobile terminal 50 sends the beacon channel on the beacon channel resource allocated by the base station of the network, and sends the broadcast signal on the broadcast channel resource corresponding to the beacon channel resource, to indicate the access resource, so that another mobile terminal connects to the mobile terminal 50 on the access resource and then accesses the network, which avoids a waste of the beacon channel and more properly uses the beacon channel and the access resource.

Figure 7:
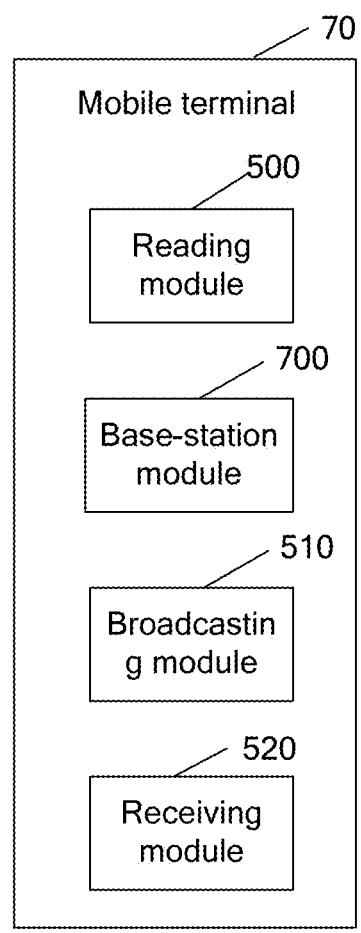

Referring to FIG. 7, a difference between a mobile terminal 70 according to this embodiment of the present invention and the mobile terminal 50 shown in FIG. 5 is that a base-station module 700 is further included in addition to a reading module 500, a broadcasting module 510, and a receiving module 520, where the reading module 500, the broadcasting module 510, and the receiving module 520 are basically the same as corresponding modules shown in FIG. 5, and details are not described herein. The base-station module 700 is configured to make the mobile terminal 70 become a base-station mobile terminal.

The broadcasting module 510 also includes the network connecting submodule 511 and the broadcasting submodule 512 shown in FIG. 6, where the network connecting submodule 511 is configured to send an allocation request to the network, and receive the beacon channel resource, the broadcast channel resource, and the access resource that are allocated by the base station of the network; and the broadcasting submodule 512 is configured to send the beacon channel on the beacon channel resource, and send the broadcast signal on the broadcast channel resource, where the broadcast signal includes the access resource.

In some implementation manners of the present invention, the network connecting submodule 511 receives the beacon channel resource, the broadcast channel resource, and the access resource that are allocated by the base station of the network by using radio resource control protocol signaling.

It may be understood that the mobile terminal 70 in this embodiment may be, for example, a computer, a mobile phone, or a tablet computer.

It may be understood that, functions of all function modules of the mobile terminal 70 in this embodiment may be specifically implemented according to the methods in the foregoing first to third embodiments. For a specific implementation process, reference may be made to related descriptions in the methods in the foregoing first to third embodiments, and details are not described herein.

The foregoing mobile terminal 70 sends the beacon channel on the beacon channel resource allocated by the base station of the network, and sends the broadcast signal on the broadcast channel resource corresponding to the beacon channel resource, to indicate the access resource, so that another mobile terminal connects to the mobile terminal 70 on the access resource and then accesses the network, which avoids a waste of the beacon channel and more properly uses the beacon channel and the access resource.

An embodiment of the present invention further provides a computer storage medium, where the computer storage medium may store a program, and the program is used to perform a part or all of steps of the network accessing method for a mobile terminal described in the foregoing method embodiments.

Figure 8:
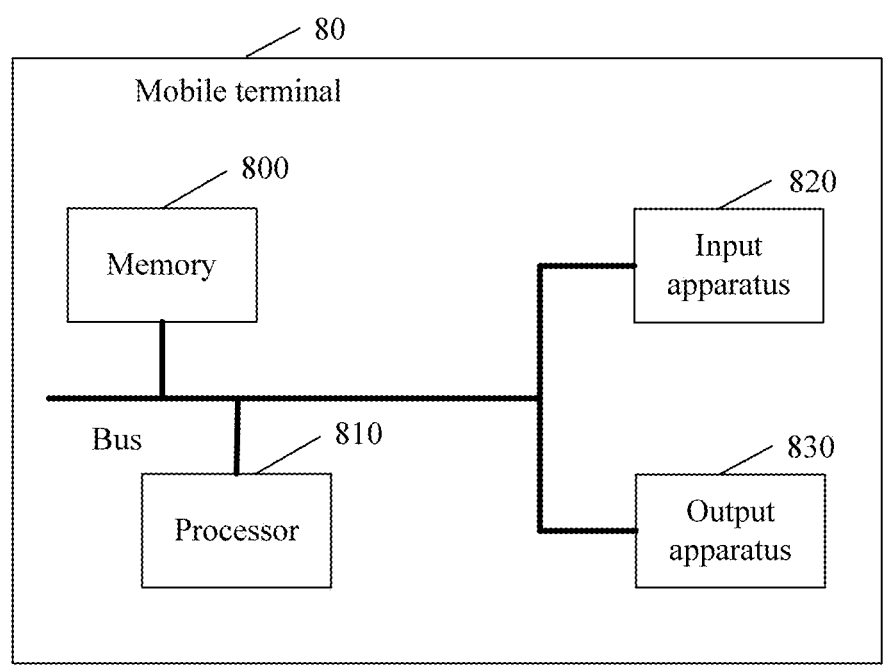

Referring to FIG. 8, an embodiment of the present invention further provides a mobile terminal 80, including a processor 810, a memory 800, an input apparatus 820, and an output apparatus 830 (there may be one or more processors 810 in the mobile terminal 80, and one processor is used as an example in FIG. 8). In some embodiments of the present invention, the input apparatus 820, the output apparatus 830, the memory 800, and the processor 810 may be connected to each other by using a bus or in another manner. That they are connected to each other by using a bus is used as an example in FIG. 8.

The processor 810 performs the following steps: reading a help request used for accessing a network by another mobile terminal; sending a beacon channel on a beacon channel resource allocated by a base station of the network, and sending a broadcast signal on a broadcast channel resource corresponding to the beacon channel resource, where the broadcast signal includes an access resource; and receiving an access request of the another mobile terminal on the access resource, and assisting the another mobile terminal in accessing the network.

In some implementation manners of the present invention, the step, which is performed by the processor 810, of sending a beacon channel on a beacon channel resource allocated by a base station of the network, and sending a broadcast signal on a broadcast channel resource corresponding to the beacon channel resource, where the broadcast signal includes an access resource further includes: sending a request for becoming a base-station mobile terminal to the network; receiving the beacon channel resource, the broadcast channel resource, and the access resource that are allocated by the base station of the network; and sending the beacon channel on the beacon channel resource, and sending the broadcast signal on the broadcast channel resource, where the broadcast signal includes the access resource.

In some implementation manners of the present invention, the step, which is performed by the processor 810, of sending a beacon channel on a beacon channel resource allocated by a base station of the network, and sending a broadcast signal on a broadcast channel resource corresponding to the beacon channel resource, where the broadcast signal includes an access resource further includes: becoming a base-station mobile terminal; sending an allocation request to the network; receiving the beacon channel resource, the broadcast channel resource, and the access resource that are allocated by the base station of the network; and sending the beacon channel on the beacon channel resource, and sending the broadcast signal on the broadcast channel resource, where the broadcast signal includes the access resource.

In some implementation manners of the present invention, the step, which is performed by the processor 810, of receiving an access request of the another mobile terminal on the access resource, and assisting the another mobile terminal in accessing the network further includes: receiving the access request of the another mobile terminal on the access resource, and assisting the another mobile terminal in completing access to the network.

In some implementation manners of the present invention, the step, which is performed by the processor 810, of receiving the beacon channel resource, the broadcast channel resource, and the access resource that are allocated by the base station of the network further includes: receiving the beacon channel resource, the broadcast channel resource, and the access resource that are allocated by the base station of the network by using radio resource control protocol signaling.

In some implementation manners of the present invention, the step, which is performed by the processor 810, of sending a beacon channel on a beacon channel resource allocated by a base station of the network, and sending a broadcast signal on a broadcast channel resource corresponding to the beacon channel resource, where the broadcast signal includes an access resource further includes: camping on the base station of the network, and acquiring a beacon channel resource set and an access resource set by means of broadcast of the base station, where the beacon channel resource set includes the idle beacon channel resource, and the access resource set includes the access resource; and sending the beacon channel on the idle beacon channel resource in the beacon channel resource set, and sending the broadcast signal on the broadcast channel resource corresponding to the beacon channel resource, where the broadcast signal includes the access resource.

In some implementation manners of the present invention, the step, which is performed by the processor 810, of receiving an access request of the another mobile terminal on the access resource, and assisting the another mobile terminal in accessing the network further includes: receiving the access request of the another mobile terminal on the access resource; and accessing the base station and requesting to become a base-station mobile terminal, so as to assist the another mobile terminal in completing access to the network.

It may be understood that, functions of all function modules of the mobile terminal 80 in this embodiment may be specifically implemented according to the methods in the foregoing first to third embodiments. For a specific implementation process, reference may be made to related descriptions in the methods in the foregoing first to third embodiments, and details are not described herein.

It should be noted that, for brief description, the foregoing method embodiments are described as a series of actions. However, a person skilled in the art should appreciate that the present invention is not limited to the described order of the actions, because according to the present invention, some steps may be performed in another order or simultaneously. In addition, a person skilled in the art should also appreciate that the embodiments described in this specification are all exemplary embodiments, and the involved actions and modules are not necessarily mandatory for the present invention.

In the foregoing embodiments, the description of each embodiment has its own focus. For a part that is not described in detail in an embodiment, reference may be made to related descriptions in other embodiments.

In conclusion, according to the network accessing method for a mobile terminal, and the mobile terminal, the beacon channel is sent on the beacon channel resource allocated by the base station of the network, and the broadcast signal is sent on the broadcast channel resource corresponding to the beacon channel resource, to indicate the access resource, so that another mobile terminal connects to the mobile terminal on the access resource and then accesses the network, which avoids a waste of the beacon channel and more properly uses the beacon channel and the access resource.

A person of ordinary skill in the art may understand that all or a part of the steps of the methods in the foregoing embodiments may be implemented by a program instructing relevant hardware. The program may be stored in a computer readable storage medium. The storage medium may include: a read-only memory, a random-access memory, a magnetic disk, or an optical disc.

The network accessing method for a mobile terminal, and the mobile terminal that are provided in the embodiments of the present invention are described in detail in the foregoing. Specific examples are used in this specification to describe the principle and implementation manners of the present invention. The foregoing embodiments are merely intended to help understand the method and core idea of the present invention. In addition, with respect to the implementation manners and the application scope, modifications may be made by a person of ordinary skill in the art according to the idea of the present invention. In conclusion, the specification shall not be construed as a limitation on the present invention.

What is claimed is:

1. A method, comprising:
    reading, by a first mobile terminal, a help request for accessing a network, wherein the help request is sent by a second mobile terminal;
    in response to reading the help request, and in response to a determination that the first mobile terminal will allow the second mobile terminal to communicate with the network using a network connection of the first mobile terminal, sending, by the first mobile terminal, a beacon channel on a beacon channel resource allocated by a base station of the network, and sending a broadcast signal on a broadcast channel resource corresponding to the beacon channel resource, wherein the broadcast signal comprises an access resource; and
    receiving, by the first mobile terminal, an access request of the second mobile terminal on the access resource, and allowing the second mobile terminal to communicate with the network using the network connection of the first mobile terminal.

2. The method according to claim 1, wherein sending the beacon channel on the beacon channel resource allocated by the base station of the network, and sending the broadcast signal on the broadcast channel resource corresponding to the beacon channel resource, comprises:
    establishing a radio resource control (RRC) connection to the base station of the network, and sending a request for becoming a base-station mobile terminal to the network;
    receiving the beacon channel resource, the broadcast channel resource, and the access resource that are allocated by the base station of the network; and
    sending the beacon channel on the beacon channel resource, and sending the broadcast signal on the broadcast channel resource, wherein the broadcast signal comprises the access resource.

3. The method according to claim 2, wherein receiving the access request of the second mobile terminal on the access resource, and allowing the second mobile terminal to communicate with the network using the network connection of the first mobile terminal, comprises:
    receiving the access request of the second mobile terminal on the access resource, and allowing the second mobile terminal to communicate with the network using the network connection of the first mobile terminal.

4. The method according to claim 2, wherein receiving the beacon channel resource, the broadcast channel resource, and the access resource that are allocated by the base station of the network comprises:
    receiving the beacon channel resource, the broadcast channel resource, and the access resource that are allocated by the base station of the network using radio resource control protocol signaling.

5. The method according to claim 1, wherein sending the beacon channel on the beacon channel resource allocated by the base station of the network, and sending the broadcast signal on the broadcast channel resource corresponding to the beacon channel resource, comprises:
    becoming a base-station mobile terminal;
    sending an allocation request to the network;
    receiving the beacon channel resource, the broadcast channel resource, and the access resource that are allocated by the base station of the network; and
    sending the beacon channel on the beacon channel resource, and sending the broadcast signal on the broadcast channel resource, wherein the broadcast signal comprises the access resource.

6. The method according to claim 1, wherein sending the beacon channel on the beacon channel resource allocated by the base station of the network, and sending the broadcast signal on the broadcast channel resource corresponding to the beacon channel resource, further comprises:
    camping on the base station the network, and acquiring a beacon channel resource set and an access resource set from a broadcast of the base station, wherein the beacon channel resource set comprises an idle beacon channel resource, and the access resource set comprises the access resource; and
    sending the beacon channel on the idle beacon channel resource in the beacon channel resource set, and sending the broadcast signal on a broadcast channel resource corresponding to the idle beacon channel resource, wherein the broadcast signal comprises the access resource.

7. The network accessing method for a mobile terminal according to claim 6, wherein receiving the access request of the mobile terminal on the access resource, and allowing the second mobile terminal to communicate with the network using the network connection of the first mobile terminal, comprises:
    receiving the access request of the mobile terminal on the access resource; and
    accessing the base station and requesting to become a base-station mobile terminal, to allow the second mobile terminal to communicate with the network using the network connection of the first mobile terminal.

8. A mobile terminal, configured to act as a first mobile terminal, the mobile terminal comprising:

an input apparatus;
an output apparatus;
a non-transitory memory; and
a processor, configured to:
   read a help request for accessing a network, wherein the help request is sent by a second mobile terminal;
   in response to reading the help request, and is response to a determination that the first mobile terminal will allow the second mobile terminal to communicate with the network using a network connection of the first mobile terminal, send a beacon channel on a beacon channel resource allocated by a base station of the network, and send a broadcast signal on a broadcast channel resource corresponding to the beacon channel resource, wherein the broadcast signal comprises an access resource; and
   receive an access request of the second mobile terminal on the access resource, and allow the second mobile terminal to communicate with the network using the network connection of the first mobile terminal.

9. The mobile terminal according to claim 8, wherein the processor being configured to send a beacon channel on the beacon channel resource allocated by the base station of the network, and send a broadcast signal on a broadcast channel resource corresponding to the beacon channel resource, comprises the processor being configured to:
   establish a radio resource control (RRC) connection to the base station of the network, and send a request for becoming a base-station mobile terminal to the network;
   receive the beacon channel resource, the broadcast channel resource, and the access resource that are allocated by the base station of the network; and
   send the beacon channel on the beacon channel resource, and send the broadcast signal on the broadcast channel resource.

10. The mobile terminal according to claim 9, wherein the processor being configured to receive an access request of the second mobile terminal on the access resource, and allow the second mobile terminal to communicate with the network using the network connection of the first mobile terminal, comprises the processor being configured to:
   receive the access request of the second mobile terminal on the access resource, and allow the second mobile terminal to communicate with the network using the network connection of the first mobile terminal.

11. The mobile terminal according to claim 9, wherein the processor being configured to receive the beacon channel resource, the broadcast channel resource, and the access resource that are allocated by the base station of the network, comprises the processor being configured to:
   receive the beacon channel resource, the broadcast channel resource, and the access resource that are allocated by the base station of the network using radio resource control protocol signaling.

12. The mobile terminal according to claim 8, wherein the processor being configured to send the beacon channel on the beacon channel resource allocated by the base station of the network, and send a broadcast signal on the broadcast channel resource corresponding to the beacon channel resource, comprises the processor being configured to:
   become a base-station mobile terminal;
   send an allocation request to the network;
   receive the beacon channel resource, the broadcast channel resource, and the access resource that are allocated by the base station of the network; and
   send the beacon channel on the beacon channel resource, and send the broadcast signal on the broadcast channel resource.

13. The mobile terminal according to claim 8, wherein the processor being configured to send the beacon channel on the beacon channel resource allocated by the base station of the network, and send the broadcast signal on the broadcast channel resource corresponding to the beacon channel resource, comprises the processor being configured to:
   camp on the base station of the network, and acquire a beacon channel resource set and an access resource set from a broadcast of the base station, wherein the beacon channel resource set comprises an idle beacon channel resource, and the access resource set comprises the access resource; and
   send the beacon channel on the idle beacon channel resource in the beacon channel resource set, and send the broadcast signal on a broadcast channel resource corresponding to the idle beacon channel resource.

14. The mobile terminal according to claim 13, wherein the processor being configured to receive an access request of the second mobile terminal on the access resource, and allow the second mobile terminal to communicate with the network using the network connection of the first mobile terminal, comprises the processor being configured to:
   receive the access request of the second mobile terminal on the access resource; and
   access the base station and request to become a base-station mobile terminal, to allow the second mobile terminal to communicate with the network using the network connection of the first mobile terminal.

15. A non-transitory computer storage medium, wherein the non-transitory computer storage medium stores a program, and the program comprises instructions for:
   reading a help request for accessing a network, wherein the help request is sent-by a second mobile terminal;
   in response to reading the help request, and in response to a determination that a first mobile terminal will allow the second mobile terminal to communicate with the network using a network connection of the first mobile terminal, sending a beacon channel on a beacon channel resource allocated by a base station of the network, and sending a broadcast signal on a broadcast channel resource corresponding to the beacon channel resource, wherein the broadcast signal comprises an access resource; and
   receiving an access request of the second mobile terminal on the access resource, and allowing the second mobile terminal to communicate with the network using the network connection of the first mobile terminal.

16. The non-transitory computer storage medium according to claim 15, wherein the program including instructions for sending the beacon channel on the beacon channel resource allocated by the base station of the network, and sending the broadcast signal on the broadcast channel resource corresponding to the beacon channel resource, comprises the program including instructions for:
   establishing a radio resource control (RRC) connection to the base station of the network, and sending a request for becoming a base-station mobile terminal to the network;
   receiving the beacon channel resource, the broadcast channel resource, and the access resource that are allocated by the base station of the network; and
   sending the beacon channel on the beacon channel resource, and sending the broadcast signal on the broadcast channel resource.

17. The non-transitory computer storage medium according to claim 16, wherein the program including instructions for receiving the access request of the second mobile terminal on the access resource, and allowing the second mobile terminal to communicate with the network using the network connection of the first mobile terminal, comprises the program including instructions for:

receiving the access request of the second mobile terminal on the access resource, and allowing the second mobile terminal to communicate with the network using the network connection of the first mobile terminal.

18. The non-transitory computer storage medium according to claim 16, wherein the program including instructions for receiving the beacon channel resource, the broadcast channel resource, and the access resource that are allocated by the base station of the network, comprises the program including instructions for:

receiving the beacon channel resource, the broadcast channel resource, and the access resource that are allocated by the base station of the network using radio resource control protocol signaling.

19. The non-transitory computer storage medium according to claim 15, wherein the program including instructions for sending the beacon channel on the beacon channel resource allocated by the base station of the network, and sending the broadcast signal on the broadcast channel resource corresponding to the beacon channel resource, comprises the program including instructions for:

becoming a base-station mobile terminal;

sending an allocation request to the network;

receiving the beacon channel resource, the broadcast channel resource, and the access resource that are allocated by the base station of the network; and sending the beacon channel on the beacon channel resource, and sending the broadcast signal on the broadcast channel resource.

20. The non-transitory computer storage medium according to claim 15, wherein the program including instructions for sending the beacon channel on the beacon channel resource allocated by the base station of the network, and sending the broadcast signal on the broadcast channel resource corresponding to the beacon channel resource, comprises the program including instructions for:

camping on the base station the network, and acquiring a beacon channel resource set and an access resource set by means of broadcast of the base station, wherein the beacon channel resource set comprises an idle beacon channel resource, and the access resource set comprises the access resource; and sending the beacon channel on the idle beacon channel resource in the beacon channel resource set, and sending the broadcast signal on a broadcast channel resource corresponding to the idle beacon channel resource.

* * * * *